United States Patent
Elsner et al.

(10) Patent No.: US 6,897,775 B2
(45) Date of Patent: May 24, 2005

(54) SENSOR, SENSOR SYSTEM, AND METHOD FOR REMOTELY SENSING A VARIABLE

(75) Inventors: Bernhard Elsner, Huenfelden (DE); Henry Heidemeyer, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 10/275,162

(22) PCT Filed: Apr. 5, 2001

(86) PCT No.: PCT/DE01/01324

§ 371 (c)(1),
(2), (4) Date: Nov. 1, 2002

(87) PCT Pub. No.: WO01/91079

PCT Pub. Date: Nov. 29, 2001

(65) Prior Publication Data

US 2003/0102984 A1 Jun. 5, 2003

(30) Foreign Application Priority Data

May 23, 2000 (DE) .......................... 100 25 503

(51) Int. Cl.$^7$ .............................. G08B 1/08; H04Q 7/00
(52) U.S. Cl. .................. 340/539.22; 340/439; 340/442; 340/686.3; 73/146
(58) Field of Search .......................... 340/539.22, 439, 340/440, 442, 447, 448, 686.3; 73/146

(56) References Cited

U.S. PATENT DOCUMENTS

| 4,069,472 A | * | 1/1978 | Kamata et al. ............... 342/44 |
| 4,090,176 A | | 5/1978 | Rodler |
| 4,096,740 A | * | 6/1978 | Sallee .......................... 73/778 |
| 4,174,515 A | * | 11/1979 | Marzolf ...................... 340/447 |
| 4,529,961 A | * | 7/1985 | Nishimura et al. ......... 340/447 |
| 5,691,698 A | * | 11/1997 | Scholl et al. ............. 340/572.5 |
| 5,694,111 A | * | 12/1997 | Huang ........................ 340/442 |
| 5,728,933 A | * | 3/1998 | Schultz et al. ............. 73/146.5 |
| 6,378,360 B1 | * | 4/2002 | Bartels ....................... 73/146.5 |
| 6,609,419 B1 | * | 8/2003 | Bankart et al. ............ 73/146.5 |

FOREIGN PATENT DOCUMENTS

| DE | 44 13 211 A | 10/1995 |
| DE | 195 10 452 A | 10/1995 |
| DE | 197 02 768 C1 | 4/1998 |
| DE | 198 51 002 A | 5/2000 |

* cited by examiner

Primary Examiner—Daniel Wu
Assistant Examiner—Samuel J. Walk
(74) Attorney, Agent, or Firm—Michael J. Striker

(57) ABSTRACT

A sensor system for remote detection of a measurable variable includes a sensor, with a first resonator (5) which has a resonant frequency that is variable under the influence of the measurable variable; an antenna (1) for sending and receiving a modulated high-frequency signal; a modem (2) for coupling the first resonator (5) to the antenna; and a second resonator (3) that can be excited by a carrier frequency of the high-frequency signal. An interrogation unit generates an inquiry radio signal for exciting the two resonators and interrupts the broadcasting of the inquiry radio signal in order to receive a response radio signal broadcast by the sensor.

16 Claims, 3 Drawing Sheets

SENSOR, SENSOR SYSTEM, AND METHOD FOR REMOTELY SENSING A VARIABLE

BACKGROUND OF THE INVENTION

Figure 1:
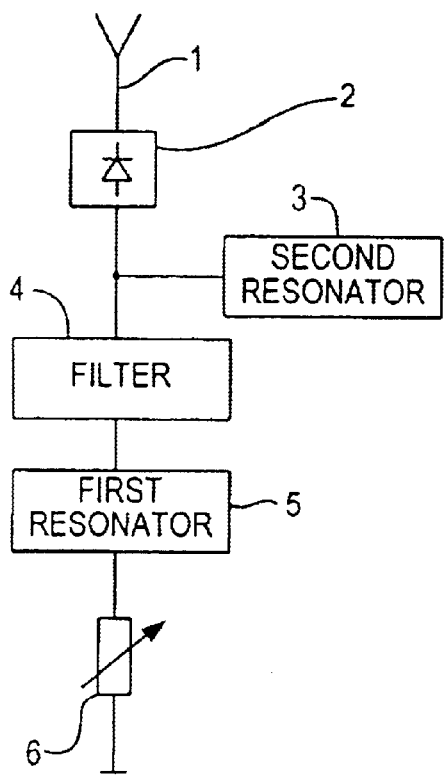

The present invention relates to a sensor for remote detection of a measurable variable, to a sensor system in which such a sensor is used, and to a method for remote detection of a measurable variable.

The capability of remote interrogation from a sensor is necessary in many areas of application, especially where it is problematic to establish a durable physical connection between a sensor and an associated evaluation unit, by way of which output signals of the sensor can be transmitted to the evaluation unit. Such connection problems occur wherever the sensor is moved relative to the associated evaluation unit, and especially in the case of rotary motions. As an example of this, detecting the pressure in an air-filled tire mounted rotatably on a vehicle can be mentioned, or measuring the torque on a rotating shaft.

These applications require the transmission of output signals from the sensor electromagnetically in the most general sense, in other words transmission of radio signals, microwave signals, or light signals. One possibility is to equip the sensor element with its own electrical power supply, in order to furnish the energy required for measuring and transmitting the output signals. However, this principle rapidly meets its limits because of the resultant costs (for a battery), the relatively high weight of the sensor unit, and the requisite maintenance since after a certain time in operation it is necessary to replace the battery.

There is accordingly a need to realize the sensor completely passively, or in other words without its own power supply, in order to circumvent the problems associated with the battery and to make the sensor smaller, lighter in weight, and less vulnerable.

One example of a sensor or sensor system that can be remotely interrogated electromagnetically is addressed in German Patent DE 19 702 768 C1. The sensor known from this reference includes the following: a resonator, which has a resonant frequency that is variable under the influence of the measurable variable, an antenna for sending and receiving a modulated high-frequency signal, and a modem for coupling the first resonator to the antenna. For remote interrogation of the variable measured by this known sensor, an inquiry radio signal is broadcast by an interrogation unit, and this signal includes an inquiry carrier signal at a second frequency that is modulated with an inquiry measurement signal at a first frequency. The frequency of the inquiry carrier signal is in the microwave frequency range of about 2.4 GHz, while that of the inquiry measurement signal is in the frequency range from 1 to 30 MHz. The inquiry radio signal is received by the antenna of the sensor and applied to the modem, whose output frequency spectrum thereupon has one component at the first frequency. The first frequency is typically in a resonant range of the resonator, so that on receiving the inquiry radio signal, this resonator is excited to a compulsory oscillation, whose amplitude depends, among other factors, on the difference between the first frequency and the resonant frequency of the resonator, which is dependent on the measurable variable. Once the resonator has been excited to oscillate, the modulation of the inquiry radio signal is interrupted, and the pure, unmodulated inquiry carrier signal is broadcast. This signal mixes in the modem of the sensor with the then-free oscillation of the resonator at its resonant frequency, and a carrier signal modulated with the resonant frequency in this way is transmitted back as a response radio signal to the interrogation unit. In the interrogation unit, a conclusion can be drawn about the current value of the measurable variable by evaluating the modulation of the response radio signal.

This known sensor can be excited by an inquiry radio signal of arbitrary carrier frequency, as long as the modulation frequency is close enough to the resonant frequency of the oscillator. In order to receive the response radio signal, the inquiry carrier signal must be broadcast continuously. It is therefore not possible to use the same antenna for broadcasting the inquiry radio signal and for receiving the response radio signal.

SUMMARY OF THE INVENTION

By means of the present invention, a sensor that can be interrogated remotely, or a sensor system having a plurality of such sensors, and a method for remote detection of the measurable variable are created, which make a faster interrogation of the measurable variable possible along with the simultaneous use of a plurality of sensors in the same spatial region, without the risk of mutual interference and without the necessity of coordinating the inquiry operations of the individual sensors.

These advantages are attained on the one hand by providing that the sensor is equipped with a second resonator that can be excited by a carrier frequency of the high-frequency signal. This design of the sensor makes it possible, during a period of time in which the modulated inquiry radio signal is broadcast by the interrogation unit, both to excite the first, tunable resonator to oscillate by means of the inquiry measurement signal and to excite the second resonator to oscillate with the aid of the inquiry carrier signal. In this way, energy from the carrier oscillation is stored at the sensor. The consequence is first that to generate the response radio signal, it is no longer necessary to simultaneously transmit the inquiry carrier signal, because the response radio signal required can be generated by the sensor, by mixing the signals of the two resonators at the modem. This response radio signal can be received and evaluated at the interrogation unit, as soon after the interruption of the broadcasting of the inquiry radio signal as the echoes thereof have faded.

Since the presence of the second resonator makes it possible to interrupt the broadcasting of the inquiry carrier signal when the response radio signal is to be received, it is possible to use the same antenna in the interrogation unit for sending the inquiry radio signal and receiving the response radio signal. It is moreover possible, in an environment in which at least one sensor is assigned to each of a plurality of interrogation units, to assign each interrogation unit and the sensors belonging to it a specific first carrier frequency, which enables the interrogation units to respond to and ask questions of only the sensors assigned to them.

The sensor is preferably a purely passive element, without its own power supply. At the modulator, a detector diode (Schottky diode or variable actuator) is therefore particularly suitable. These components, because their characteristic curve is already highly nonlinear in the vicinity of zero voltage, generate a strong coupling of the various spectral components of an applied signal and thus promote the development of differential or summation frequencies.

As the first resonator, surface wave resonators or quartz oscillators are suitable. Such resonators are not affected directly in their behavior by the variable to be detected but instead are expediently used in an oscillator circuit together with a component that is sensitive to the variable to be detected. This makes it possible to use economical standard components for the resonators.

As the element sensitive to the measurable variable, a resistor element, with a resistance that is variable under the influence of the measurable variable, is preferably used. Preferred measurable variables are the pressure or the temperature, for example.

To prevent the response radio signal from being rendered incorrect by the damping of the oscillation of the second oscillator, which oscillator is unaffected by the measurable variable, this oscillator is expediently constructed in such a way that it has a lesser damping than the first resonator, so that in the ideal case, even the oscillation of the second resonator can be considered to be constant during the measurement period.

As the second resonator, surface wave resonators are particularly suitable, which are capable in reaction to a first excitation oscillation pulse of generating a delayed output oscillation pulse. Such resonators can be embodied for instance surface wave filters with a first pair of electrodes for exciting the surface wave and a three-dimensionally spaced-apart second pair of electrodes for picking up the surface wave, or as a resonator with a single pair of electrodes that serves both to excite and to pick up the surface wave; reflector electrodes are disposed at a distance from the electrode pair, in order to reflect the surface wave, propagating in the resonator substrate, to the electrode pair with a time lag.

In the remote detection of a measurable variable using a sensor of the type described above, first its two oscillators are excited by an inquiry radio signal, which includes an inquiry carrier signal at a second frequency that is modulated with an inquiry measurement signal at a first frequency. To perform a remote interrogation, the broadcasting of the total inquiry radio signal, both of the carrier and of the modulation, is interrupted, and a response radio signal broadcast by the sensor is intercepted, which includes a response carrier signal at the resonant frequency of the second oscillator, modulated with a response measurement signal at the resonant frequency of the first oscillator. Since within this time no inquiry carrier signal can be broadcast, the background out of which the response radio signal has to be isolated is only slight, so that slight reception strengths are sufficient for satisfactory measurement.

Since within the time when the response radio signal is intercepted no inquiry radio signal can be broadcast, the same antenna can be used for both sending the inquiry radio signal and receiving the response radio signal, without the risk of crosstalk from the inquiry to the reception.

If the second resonator furnishes an oscillation pulse that is delayed compared to the excitation, then it is expedient to select the time interval within which the inquiry radio signal is broadcast as shorter than the time lag of the second resonator. This in fact means that the sensor does not begin broadcasting the response radio signal until after a delay after the end of the inquiry radio signal.

This delay is advantageously selected such that echoes of the inquiry radio signal have faded before the response radio signal arrives at the interrogation unit.

Further characteristics and advantages of the invention will become apparent from the ensuing description of an exemplary embodiment in conjunction with the accompanying drawings.

DRAWINGS

Figure 2:
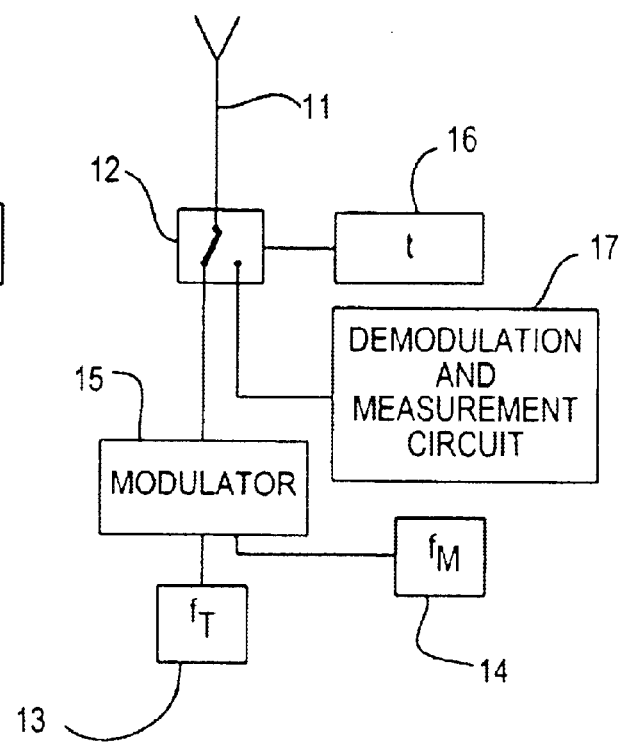
Figure 3:
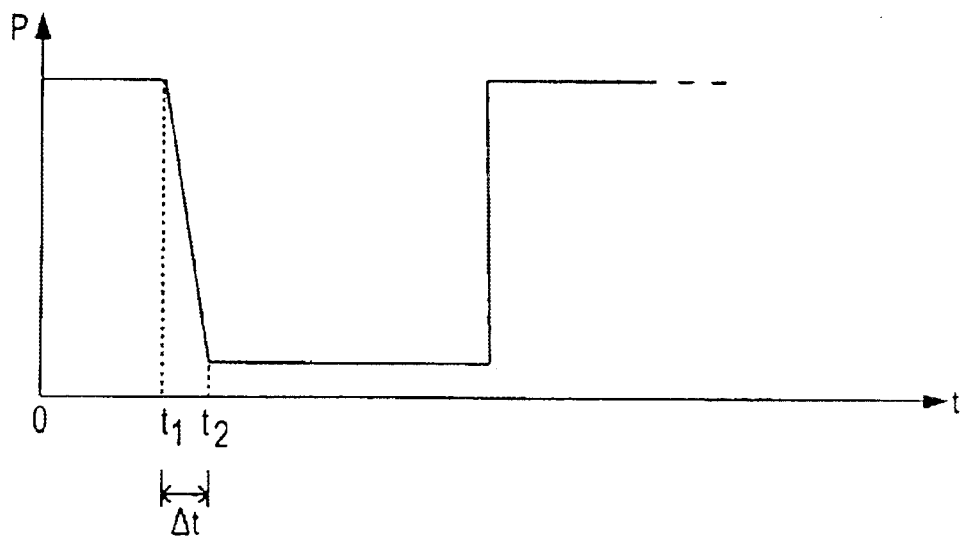
Figures 4, 5:
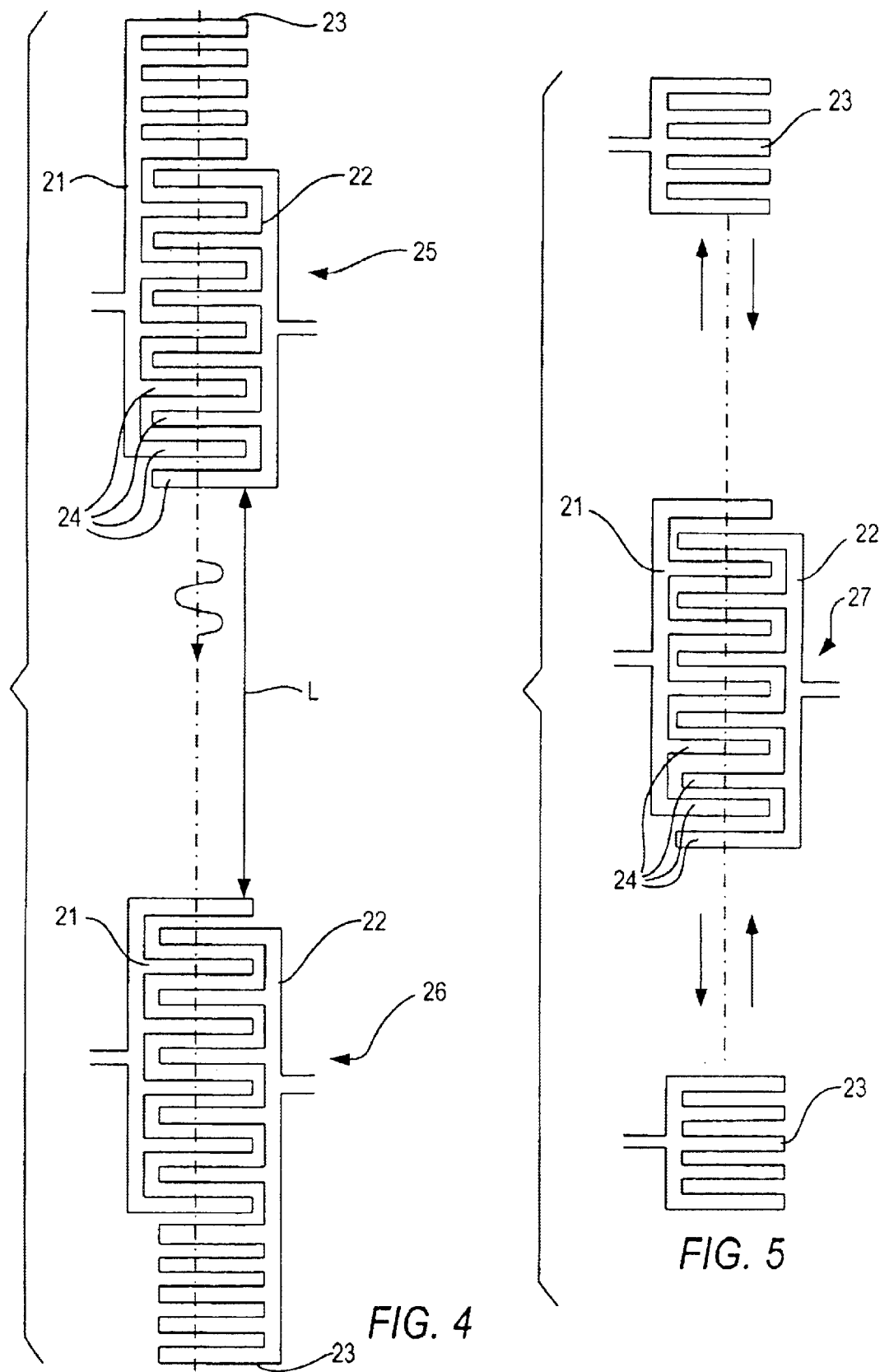
Figure 6:
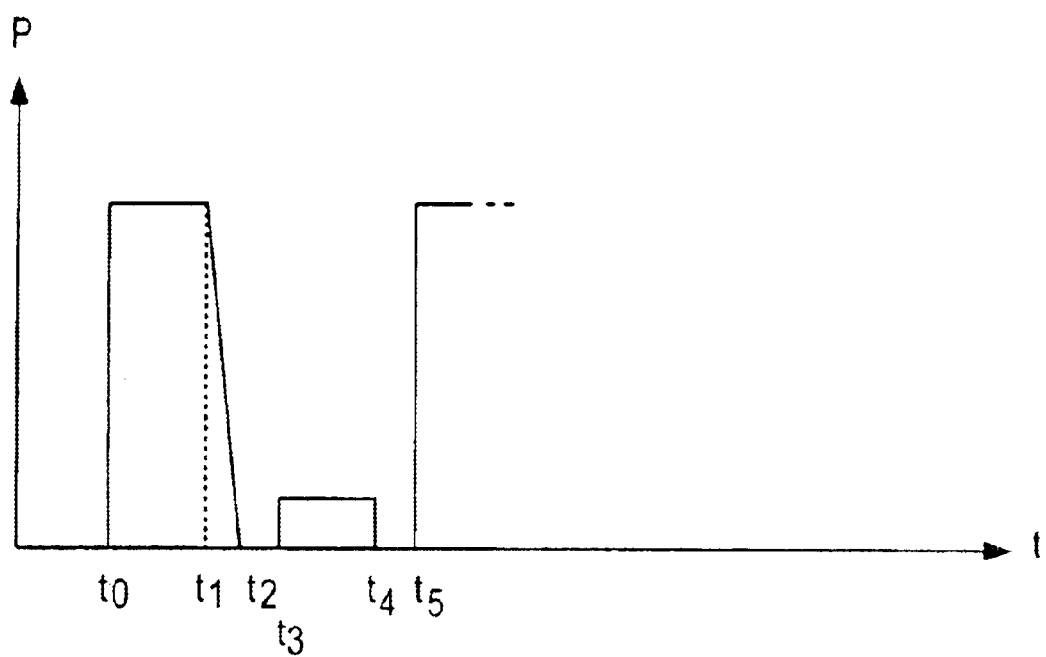

FIG. 1, a block diagram of a sensor according to the invention;

FIG. 2, a block diagram of an interrogation unit for the sensor of FIG. 1;

FIG. 3, the course over time of the intensities in the radio signals at the antenna of the interrogation unit;

FIGS. 4 and 5, examples for the layout of a surface wave resonator which is suitable as a second resonator for a sensor of the invention; and FIG. 6, the course over time of the intensities in the radio signals at the antenna of the interrogation unit, when a second resonator of FIG. 4 or 5 is used.

DESCRIPTION OF THE PREFERRED EMBODIMENTS

A sensor system of the invention for remote interrogation of a measurable variable comprises an interrogation unit, as shown in FIG. 2, and one or more sensors, as shown in FIG. 1. An oscillator 13, which generates a signal, here called an inquiry carrier signal, at a carrier frequency $f_T$ in the range of 2.54 GHz, is located in the interrogation unit. The carrier frequency is preferably intentionally variable by a few MHz. A second oscillator 14 generates an inquiry measurement signal in the form of an oscillation at a frequency $f_M$ in the range from 0 to 80 MHz. If the interrogation unit is used to interrogate a plurality of sensors, then the measurement frequency $f_M$ is expediently also intentionally variable, specifically in increments that correspond to the magnitude of the resonance range of a first resonator of the sensors, which will be addressed in further detail hereinafter.

A modulator 15 is connected to the two oscillators 13, 14; it modulates the inquiry measurement signal up to the inquiry carrier signal and thus generates an inquiry radio signal, which is output to a switch 12. The switch 12 is under the control of a timer 16, which connects a sending and receiving antenna 11 in alternation to the output of the modulator 15 and the input of a demodulation and measurement circuit. The modulation performed by the modulator 15 can in particular be an amplitude modulation or a quadrature modulation; the demodulation that takes place in the demodulation and measurement circuit is complementary to that.

The inquiry radio signal broadcast by the antenna 11 is received by an antenna 1 of the sensor shown in FIG. 1. Connected to the antenna is a demodulation diode 2, such as a Schottky or detector diode. Such a diode is distinguished by a characteristic curve that is already essentially parabolic in the vicinity of the coordinate origin and is thus distinguished by a strongly nonlinear behavior, which leads to a mixing of the spectral components contained in the inquiry radio signal and thus to the generation of a spectral component with the frequency $f_M$ of the measurement signal at the output of the demodulation diode 2. The spectral component at the carrier frequency $f_T$ that also appears at the output of the demodulation diode 2 serves to excite a resonator 3, here called the second resonator.

Also connected to the output of the demodulation diode 2 are a low-pass filter 4 and, downstream of the low-pass filter 4, a so-called first resonator 5, which together with an element 6 that is sensitive to the measurable variable forms an oscillating circuit. The first resonator 5, just like the second resonator 3, is a commercially available component, such as a quartz oscillator or a surface wave resonator. Because of the interconnection with the sensitive element 7, the resonant frequency of the first resonator 5 is variable as a function of the measurable variable.

The purpose of the low-pass filter 4 is essentially to keep spectral components in the range of the carrier frequency $f_T$ away from the first resonator 5, and thus to prevent them from being dissipated in the first resonator 5. In this way, the low-pass filter 4 not only brings about a more-effective excitation of the second resonator 3, as long as the inquiry radio signal is being received by the antenna 1, but also, when there is a pause in the inquiry radio signal, the low-pass filter 4 limits the damping of the second resonator 3.

The sensitive element 6 can be a resistive element, such as a temperature-dependent resistor, if the measurable variable is the temperature. A resistive element of this kind has an influence on both the resonant frequency and the time constant of the first resonator 5. It can also be a capacitive element, such as a micromechanical pressure sensor, with two capacitor plates that are movable relative to one another as a function of the prevailing pressure. A capacitive element of this kind essentially influences only the resonant frequency but not the damping of the first resonator 5.

FIG. 3 schematically shows the course of the received field intensity P at the antenna 11 of the interrogation unit, as a function of the time t in the course of one interrogation cycle. The received field intensity P is plotted using a logarithmic scale. During a time period $t=0$ to $t=t_1$, the inquiry radio signal is broadcast and is thus necessarily stronger, by orders of magnitude, than the echo signals thrown back from the vicinity of the interrogation unit, or than any response signal furnished by a sensor.

At time $t_1$, the switch 12 connects the antenna 11 to the demodulation and measurement circuit 17, and the broadcasting of the inquiry radio signal is interrupted. During a brief time period $[t_1, t_2]$, echoes in the inquiry radio signal, which have been thrown back by obstacles at various distances in the vicinity of the antenna 11 arrive at the antenna 11.

Once these echo signals have faded, only a response radio signal now arrives at the antenna 11; this signal has been generated in the sensor by mixing of the oscillations of the two resonators 3, 5 in the diode 2 that now functions as a modulator and has been broadcast via the antenna 1. The demodulation and measurement circuit 17 therefore waits, after the switchover of the switch 12, for a predetermined length of time Δt before it begins to examine the response signal, received from the antenna 11, for its frequency and/or damping and thus to extract the information it contains about the measurable variable.

The delay Δt can be fixedly predetermined as a function of the sending and receiving power of the interrogation unit, for example in such a way that for a given model of interrogation unit, a maximum range is determined, from which echo signals can still be detected by the interrogation unit, and the delay Δt is selected to be at least equal to twice the transit time that corresponds to this range.

However, since during the Δt the oscillations of the resonators 3 and 5 also fade, it is more advantageous for the delay time Δt to be selected as being as short as possible, as a function of the particular environment in which the interrogation unit is used, so that for a specific usage environment, for instance, the maximum distance of a potential echo source from the interrogation unit is determined, and the delay is selected to be at least equal to twice the signal transit time from the sensor element to the interrogation unit, and thus is selected to be precisely large enough that an echo from that source is not evaluated.

FIGS. 4 and 5 show two exemplary embodiments of surface wave resonators, which in a preferred further development can be used as a first resonator 3 of a sensor of the kind shown in FIG. 1.

The fundamental design of a structure for exciting and picking up surface waves from a substrate, with the aid of two electrodes 21, 22 deposited on its surface, with a plurality of parallel fingers 24 meshing with one another in comblike fashion, is known and need not be explained here in detail.

The resonator shown in FIG. 4 includes two pairs 25, 26 of such electrodes 21, 22, in each of which one pair, 25 or 26, can serve as a transmitter for exciting a surface wave, while the other pair, 26 or 25, can serve as a receiver for picking up the oscillation. Of the two electrodes of each pair 25, 26, one, on the side remote from the opposite pair 26, 25, is provided with a reflector structure 23, which prevents the propagation of the surface wave. The two pairs 25, 26 are separated from one another by a spacing L, which causes an oscillation excited by one pair to reach the other pair at a delay $\tau \approx c/L$, where it can be picked up.

The surface wave resonator shown in FIG. 5 includes only one pair 27 of electrodes, with electrodes 21, 22 that each broadcast in both directions perpendicular to the electrode fingers 24. At a spacing L/2 from the pair 27 of electrodes, reflector structures 23 are provided, which intrinsically reflect a surface wave, transmitted from the pair 27 of electrodes, back again. The reflected surface wave thus reaches the electrode pair 27 again at the same delay $\tau \approx c/L$ as in the case of FIG. 4 and can be picked up there.

FIG. 6 is a schematic illustration of the course of the received field intensity P at the antenna 11 of the interrogation unit, as a function of the time t in the course of one interrogation cycle, which course results when a surface wave resonator of the design shown in FIG. 4 or 5 is used as the second resonator of the sensor.

During a time $t=t_0$ to $t=t_1$, the inquiry radio signal is broadcast, just as in the case of FIG. 3. At time $t_1$, the broadcasting of the inquiry radio signal is interrupted; the received field intensity P at the antenna 11 decreases to the same extent as the echoes, thrown back from the vicinity of the antenna 11, in the inquiry radio signal fade.

At time $t_3=t_0+\tau$ (signal transit times between the interrogation unit and the sensor are ignored), the surface wave, which has been excited by the sensor in the second resonator 3 during the reception of the inquiry radio signal, begins to reach the pair of electrodes, where it is picked up, so that from time $t_3$ on, a modulated response radio signal is generated at the sensor. Because the length of the second resonator 3, or the delay τ within this resonator 3, is selected to be great enough, it is possible, between the fading of the echos at time $t_2$ and the arrival of the response radio signal at time $t_3$, for there to be a pause in reception, with a negligible received field intensity that is detectable by the demodulation and measurement circuit of the interrogation unit and that permits the interrogation unit to distinguish unambiguously between an echo and a response radio signal. At time $t_4=t_1+\tau$, the surface wave oscillation has passed completely through the pair of electrodes performing the pickup, and the generation of the response radio signal ceases.

After a brief further delay, at time $t_5$, a new operating cycle of the interrogation unit of the sensor begins with the renewed broadcasting of the inquiry radio signal.

Typically, the measurement frequency of the inquiry measurement signal is selected such that with it, an excitation of the first resonator 5 is possible. However, as a consequence of a major change in the measurable variable, it can happen that the resultant resonant frequency of the first resonator 5 is varied so sharply that effective excitation of the first resonator at the frequency of the inquiry measurement signal is no longer possible. In that case, the response radio signal cannot be modulated, or cannot be modulated with an intensity sufficient to obtain the measurable variable from the signal received at the interrogation unit. It is therefore provided in a preferred refinement of the remote interrogation system that the frequency of the oscillator 14, that is, the measurement frequency $f_M$, is intentionally variable, and that the interrogation station varies this frequency $f_M$ if an unusable response radio signal is received, or in other words if a response radio signal is received whose quality is insufficient to ascertain the measurable variable from it in the demodulation and measurement circuit.

Such a change in the measurement frequency can be effected iteratively, beginning at the particular value $f_M*$ of the measurement frequency $f_M$ at which a usable response radio signal was last received. One possible procedure for example is that the vicinity of this last usable measurement frequency $f_M*$ is investigated progressively, in alternation above and below the measurement frequency $f_M*$, for lesser or greater deviations from this measurement frequency $f_M*$. It is also conceivable, using two previously used measurement frequencies, to ascertain a trend in the variation of the resonant frequency of the first resonator 5, and then to search in the direction indicated by this trend over a plurality of increments, before beginning to search in the opposite direction. Which one of these search strategies would be more effective can depend on the particular specific usage environment of the system.

Under the influence of the measurable variable, the first resonator is tunable in a frequency range whose width is typically 4 MHz. The limits of the tuning range are limits that are not exceeded by the above-explained search method, either.

Disruptions in receiving the response radio signal can also occur if a plurality of interrogation units that use the same frequencies interfere with one another. Given the purposeful construction of a sensor system with a plurality of interrogation units, this problem can be avoided by providing that each interrogation unit and its assigned sensors are each allocated a specific carrier frequency $f_T$ that is characteristic for the interrogation unit. This assures that each interrogation unit will excite only the second resonators 3 of the sensors assigned to it, so that these sensors can generate a response radio signal to their interrogation unit only whenever they have been excited by that interrogation unit. It is true that inquiry radio signals broadcast by other interrogation units may possibly excite the first resonator 5, if the modulation frequency $f_M$ of these inquiry radio signals matches the resonant frequency of the resonator 5; however, since the second resonator 3 is not excited, no response radio signal can arise.

When the second resonators of FIG. 4 or 5 are used, which do not furnish the response carrier signal until after a time lag τ, selectivity in the inquiry can additionally be achieved by providing that sensors with different delay times τ are used. For example, a delay τ can be fixedly assigned to one interrogation unit, so that it will not detect response radio signals from sensors that have the same carrier frequency and measurement frequency as the inquiry radio signal broadcast by them, because their response radio signals do not occur in the same time slot, dependent on the delay τ, within which the interrogation unit evaluates the arriving radio signals.

It is also possible for one interrogation unit to be assigned a plurality of sensors that have the same carrier and measurement frequencies but different delay times τ. All of these sensors can be excited with a single pulse of the inquiry radio signal, but the response radio signals that they furnish arrive in succession, chronologically separately from one another, at the interrogation unit, so that the demodulation and measurement circuit can assign the various response radio signals to the individually excited sensors, or to the variables monitored by them, on the basis of the time at which they arrive.

What is claimed is:

1. A sensor for remote detection of a measurable variable, having a first resonator (5), which has a resonant frequency that is variable under the influence of the measurable variable, having an antenna (1) for sending and receiving a modulated high-frequency signal and a modulator (2) for coupling the first resonator (5) to the antenna (1), characterized in that it includes a second resonator (3), which is excitable by a carrier frequency of the modulated high-frequency signal.

2. The sensor of claim 1, characterized in that the modulator (2) is a demodulation diode selected from the group consisting of a Schottky diode and a detector diode.

3. The sensor of claim 1, characterized in that the first resonator (5) includes a surface wave resonator or a quartz oscillator.

4. The sensor of claim 3, characterized in that the first resonator (5) further includes a discrete component (6) that is sensitive to the measurable variable.

5. The sensor of claim 1, characterized in that the measurable variable is a pressure or a temperature.

6. The sensor of claim 1, characterized in that the damping of the second resonator (3) is less than that of the first resonator (5).

7. The sensor of claim 1, characterized in that the second resonator (3) is a surface wave resonator, which is capable of generating a delayed output oscillation pulse in reaction to an excitation oscillation pulse.

8. The sensor of claim 7, characterized in that the second resonator has two three-dimensionally spaced-apart pairs (25, 26) of electrodes (21, 22).

9. The sensor of claim 7, characterized in that the second resonator (5) has a pair (27) of electrodes (21, 22) for exciting and picking up a surface wave and has reflector electrodes (23) spaced apart from the electrode pair (27).

10. A sensor system, having a plurality of sensors of claim 1, and at least one interrogation unit for sending an inquiry radio signal to the sensors and for receiving a response radio signal from the sensors, characterized in that the first resonators (5) each have different resonant frequency ranges.

11. The sensor system of claim 10, characterized in that each interrogation unit is assigned a first specific carrier frequency ($f_T$) of the inquiry radio signal and at least one sensor whose second resonator (5) is excitable selectively by the specific carrier frequency ($f_T$).

12. An interrogation unit for a sensor of claim 1, characterized in that it has oscillators (13, 14) for generating an inquiry radio signal, which includes an inquiry carrier signal at a second frequency ($f_T$), which signal is modulated with an inquiry measurement signal at a first frequency ($f_M$), and has a common antenna (11) for broadcasting the inquiry radio signal and receiving a response radio signal from one of the sensors, and the interrogation unit interrupts the broadcasting of the inquiry radio signal in order to receive the response radio signal.

13. The interrogation unit of claim 12, characterized in that the frequency of the inquiry carrier signal ($f_T$) is variable.

14. A method for remote detection of a measurable variable using the sensor of claim 1, in which the two oscillators (3, 5) of one sensor are excited by an inquiry radio signal which includes an inquiry carrier signal at a second frequency ($f_T$), which signal is modulated with an inquiry measurement signal at a first frequency ($f_M$), and a response radio signal, broadcast by the sensor, is received and evaluated, which includes a response carrier signal at the resonant frequency of the second oscillator (3), modulated with a response measurement signal at the resonant frequency of the first oscillator (5), and for receiving the answer radio signal, the sending of the inquiry carrier signal is interrupted.

15. The method of claim 14, characterized in that the inquiry radio signal and the response radio signal are sent and received via the same antenna (11).

16. The method of claim 14, characterized in that if no adequate response measurement signal is received, the frequency of the inquiry response signal is varied.

* * * * *